Patented Aug. 14, 1951

2,564,654

UNITED STATES PATENT OFFICE 2,564,654

FLUORENONYLAMINO ANTHRAQUINONE ACID DYESTUFFS

Curt G. Vogt, Union, N. J., assignor to General Aniline & Film Corporation, New York, N. Y., a corporation of Delaware No Drawing. Application December 17, 1947, Serial No. 792,351

4 Claims. (Cl. 260—374)

1

The present invention relates to new compounds of the anthraquinone series, more particularly to new greenish-blue acid dyestuffs of the general formula:

and to the alkali metal and ammonium salts thereof.

The dyestuffs of the above formula contain a sulfo group in 2-position of the anthraquinone nucleus and in the form of the free acid or as the alkali metal or ammonium salt are compounds of very limited solubility in water. They may be applied to the dyeing of animal or nylon (linear polyamide) fibers in the form of aqueous dispersions in a suitable medium such as lignin sodium sulfonate. The compounds dye wool or nylon from acid or neutral bath in greenish blue shades of good fastness to light, washing and crocking, these fastness properties being the stronger in the nylon dyeings.

The new dyestuffs can be obtained by condensing 1-amino-4-halogen-anthraquinone-2-sulfonic acid (halogen may be chlorine or bromine) or the alkali metal or ammonium salts thereof with the corresponding fluorenoneamine, which may be 1-, 2-, 3- or 4-aminofluorenone. The condensation is carried out by heating an aqueous solution of the 1-amino-4-halogen-anthraquinone-2-sulfonic acid or of a salt thereof in admixture with a solution of the fluorenoneamine in a water-miscible organic solvent such as ethanol in the presence of a catalyst for the condensation such as copper or a copper salt and an acid binding agent such as sodium or potassium bicarbonate. To insure obtaining the product in the highest state of purity, the reaction is preferably carried out with exclusion of air from the hot reaction mixture. This may be accomplished by conducting the reaction in an atmosphere of an inert gas such as nitrogen or carbon dioxide or the like.

The dyestuffs may be sulfonated to increase their solubility in water by treatment with oleum or concentrated sulfuric acid. From 1 to 3 sulfonic acid groups are introduced, depending on the number of reactive positions available in the molecule of the compounds. Most probably the sulfonic acid group or groups enter into the benz nuclei of the fluorenonyl radical of the compounds. The sulfonated dyestuffs as the free acid or in the form of the alkali metal or ammonium salts have good levelling properties and dye animal and nylon fibers from neutral or acid bath in greenish blue shades of good fastness to light, washing and crocking.

The alkali metal and ammonium salts of the dyestuffs can be prepared in known way by reacting the free acid of the dyestuff with an aqueous solution of an equivalent weight of caustic alkali, e. g., sodium hydroxide, or of ammonia. By heating the salt of the dyestuff in dilute aqueous hydrochloric acid, the dyestuff is precipitated as the free acid and can be collected by filtration.

The capacity of the new compounds to dye animal and nylon fibers from neutral bath is a very valuable property for the union dyeing of textiles where one of the fibers is sensitive to the action of acids. For example, in the dyeing from neutral bath of mixed fibers of wool and cotton or of nylon and cotton with a dyestuff of the invention, the wool and nylon is in each case dyed a greenish blue shade whereas the cotton, which remains undyed, is not tendered as would occur on using an acid bath for the dyeing. A preferred group of the compounds for use in neutral bath dyeing are the ammonium salts because of the nearly neutral character of the aqueous solutions thereof which can be obtained with water.

The invention is further illustrated by the following examples to which, however, it is not intended that it be limited. Parts are by weight.

*Example 1*

A mixture of 36.4 parts of sodium 1-amino-4-bromoanthraquinone-2-sulfonate, 8.4 parts sodium bicarbonate, 5.3 parts sodium carbonate and 500 parts water is charged into a reaction vessel equipped with a stirrer, thermometer and reflux condenser. To this mixture at 80° C. is added a suspension of 23.4 parts 2-aminofluorenone in 245 parts ethanol and 2 g. cuprous chloride. The mixture is maintained with stirring at gentle reflux for six hours. A sample viewed with the low power microscope shows many fine greenish blue needles. The reaction mixture is filtered and the cake dispersed in 1000 parts of hot water. At 80° C. is added 100 parts hydrochloric acid (10% by weight). The precipitate which forms is collected by filtration. The cake is reslurried and again precipitated by essentially the same procedure. The cake is washed with water. A portion evaporated to dryness with ammonium hydroxide yields a product which dyes nylon well from the neutral or acid bath in attractive blue shades of good fastness and has the probable formula:

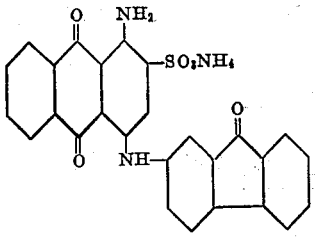

*Example 2*

Four parts of the dried cake from Example 1 are pulverized and sulfonated by stirring with 70 parts 20% oleum for fifteen minutes at 50° C. The solution is poured over 200 parts ice. The dyestuff, which is freely soluble, is precipitated by the addition of ammonium hydroxide and salt. The product dyes wool and nylon in attractive blue shades of good light fastness.

*Example 3*

A portion of the paste from Example 1 is milled to dryness in the Werner-Pfleiderer mill with an equal weight (based on the dry content of the paste) of a dispersing agent which essentially is lignin sodium sulfonate. The resultant dispersed material colors nylon attractive blue shades of good strength from either the neutral or acid bath. The dyeings show good fastness to washing and have excellent fastness to light in both heavy and light shades.

I claim:

1. An anthraquinone compound selected from the group consisting of the free acid of the formula:

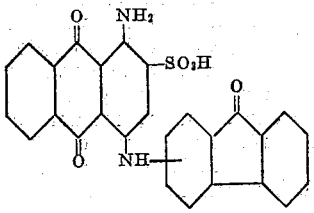

and the alkali metal and ammonium salts thereof.

2. An anthraquinone compound selected from the group consisting of the free acid of the formula:

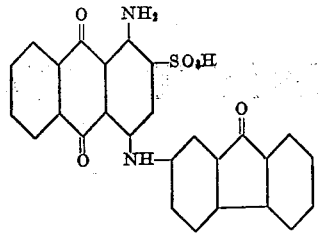

and the alkali metal and ammonium salts thereof.

3. An anthraquinone compound of the formula:

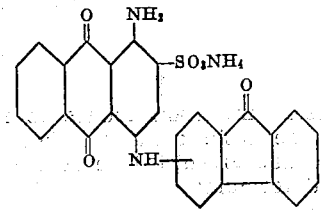

4. The anthraquinone compound of the formula:

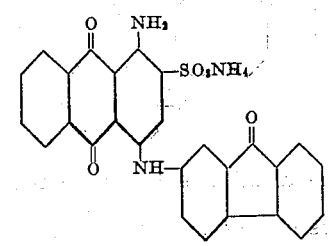

CURT G. VOGT.

REFERENCES CITED

The following references are of record in the file of this patent:

UNITED STATES PATENTS

| Number | Name | Date |
|---|---|---|
| 2,113,231 | Deinet | Apr. 5, 1938 |
| 2,369,969 | Lulek et al. | Feb. 20, 1945 |

FOREIGN PATENTS

| Number | Country | Date |
|---|---|---|
| 7,632 | Great Britain | Dec. 1, 1910 |
| 269,194 | Germany | Jan. 13, 1914 |
| 568,567 | Germany | Jan. 20, 1933 |